Jan. 29, 1935.  G. M. GORDON  1,989,409
METHOD AND APPARATUS FOR COMPACTING AND DEWATERING CEMENTITIOUS MATERIALS
Filed May 24, 1932
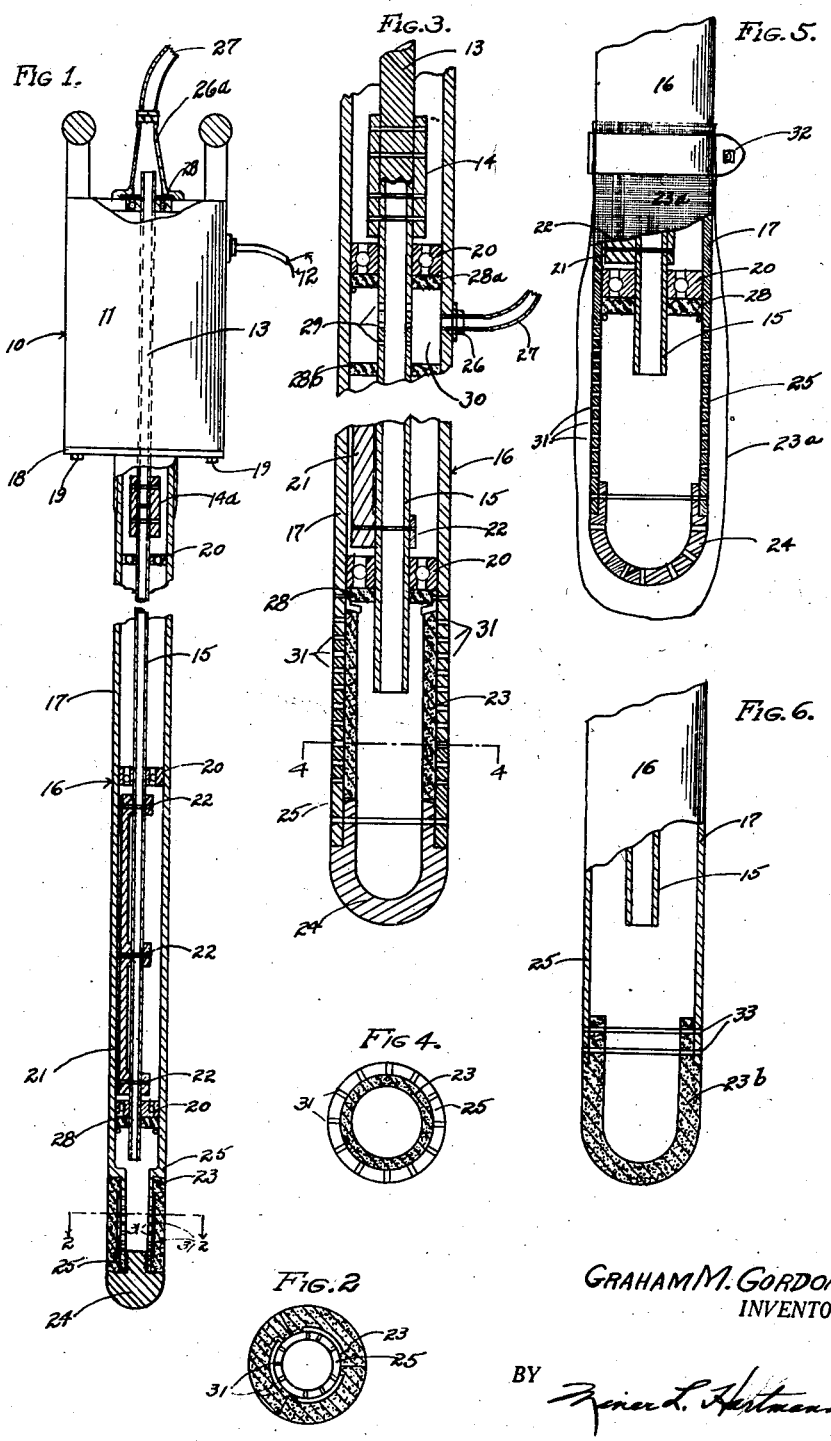
GRAHAM M. GORDON.
INVENTOR.
BY
ATTORNEY.

Patented Jan. 29, 1935

1,989,409

UNITED STATES PATENT OFFICE 1,989,409

METHOD AND APPARATUS FOR COMPACTING AND DEWATERING CEMENTITIOUS MATERIALS

Graham M. Gordon, Los Angeles, Calif., assignor to Viber Company, Limited, Los Angeles, Calif., a corporation Application May 24, 1932, Serial No. 613,228

12 Claims. (Cl. 25—1)

My invention relates to a method and apparatus for simultaneously compacting and dewatering Portland cement concrete or other hydraulic cementitious materials.

In the compacting of plastic masses, particularly Portland cement concrete by vibration, it has been observed that water is attracted to the point of vibration. When internal vibration is used, as for example in the method disclosed in Pelton, U. S. Patent No. 1,747,555 of February 18, 1930, with the use of an inserted and removable vibrator, free water is attracted to or collects at the point or near the point of maximum vibration. It is now well established in the art of making and using Portland cement that the strength of the set and hardened concrete is greatly increased if the water in the mixture at the time of setting is kept at a minimum. Concrete mixes containing a large proportion of coarse aggregate and sand in comparison to the amount of Portland cement tend to be low in plasticity or workability and in order to economically and satisfactorily place these harsh mixtures in forms and molds, it is now the practice to use an excess of water, that is, more water than is necessary to bring about the chemical reactions causing setting and hardening, with a consequent lowering of the strength of the finished concrete structure.

It has further been established that concrete may be compacted to greater density, with improved strength, uniformity other desirable physical properties by vibration, and particularly internal vibration as described in the above mentioned patent. This invention resides in the provision of a method and simple apparatus for vibrating the plastic mass of concrete and simultaneously removing the free water which collects or migrates to the point of vibration.

It is therefore a chief object of my invention to provide a method of placing cementitious materials in molds or forms by simultaneously compacting by internal vibration and removing of the excess free water at the point of vibration.

A further object is to provide a simple mechanism by which compaction and dewatering of concrete masses may be simultaneously effected.

Briefly the invention consists in a method and apparatus for forming concrete bodies comprising pouring the mixed ingredients, including water into a form, inserting a vibratory member equipped with suction filtering means whereby the free water which collects at the point of vibration is continuously removed, and the removal of the vibratory filtering member before the concrete has set.

In the accompanying drawing Fig. 1 is a vertical cross section of one form of my apparatus, the motor unit casing and handles being shown in elevation; Fig. 2 is a horizontal cross-section of Fig. 1 taken substantially on the line 2—2. Fig. 3 is a fragmentary vertical cross-section showing another arrangement of the suction vibrator tube, but omitting the electric motor. Fig. 4 is a horizontal cross-section of Fig. 3 taken substantially on the line 4—4 to show the relative positions of the openings in the shell and the filtering medium. Fig. 5 illustrates in fragmentary cross-section another form of the filtering vibrator unit, comprising a fabric bag clamped over the insertion end of the vibrator tube which is provided with openings or holes for the removal of water after being sucked through the filtering bag. Fig. 6 shows in fragmentary cross-section another construction of my filtering vibrator comprising an end piece made of solid filtering medium.

Referring more particularly to the drawing, the electric motor 10 encased in a housing 11 and connected electrically through suitable control switches by the terminals 12, rotates its shaft 13 which is flexibly attached through the flexible coupling 14 to the shaft 15 of the vibrator 16. The vibrator is enclosed in a tubular housing 17, which is attached to the motor housing 11 by the plate 18 and bolts 19. The elongated shaft 15 is supported by ball bearings 20 between the lower two of which is mounted an eccentric weight 21 held to the shaft by the pins 22. At the lower end of the tubular vibrator the filtering medium 23 is supported by an extension 25 of the tubular housing 17 and the end piece 24. Means for removal of the liquid which is filtered through the filtering medium 23 in Fig. 1 comprises the hollow shaft 15 connected through the flexible coupling 14a so designed that it permits the transmission of the liquid through the hollow motor shafting 13 to the outlet nozzle 26a, to which is attached a flexible suction hose 27, which is connected to suction means not shown. The liquid is prevented from getting into the bearings by the packings 28. In Fig. 3, the liquid which is filtered through the filtering medium 23 is sucked through the hollow shaft 15 and thrown out of the openings 29 in the shaft into the chamber 30 formed between packings 28a and 28b, from which chamber it is removed by suction through the nozzle 26, and the flexible suction hose 27 which is attached to suction means not shown.

The filtering medium 23 may be outside the supporting tubular extension 25 having holes 31 to permit the entrance of the filtered liquid and subsequent removal by the suction means as shown in Fig. 1, Fig. 2 and Fig. 5; or the filtering medium 23 may be inside the supporting tubular extension 25 as shown in Fig. 3, Fig. 4 and Fig. 6. In Fig. 5 the filtering medium is indicated as a fabric bag 23a fastened to the lower end of the vibrator tube by the clamping arrangement 32. In Fig. 6 the filtering medium is a rigid porous medium, such as a porous ceramic body 23b, which itself constitutes the end of the vibrator tube and is held to the extension tube 25 by the pins 33.

The method of operation is as follows: the tubular filtering vibrator mechanism is inserted within the cementitious mass such as wet concrete in place in forms or in mass. The vibrator unit is set in operation either before, during or after insertion and suction is simultaneously applied to the suction nozzle. The vibration of the concrete causes the excess water to migrate to the region of maximum vibration, which is around the inserted end of filtering tube, where it is pulled through the filtering medium by the suction applied to the interior of the tube. The filtering medium prevents the removal of the fine sand and cement, and allows the removal of only water. The vibrator filtering unit is then withdrawn and the concrete or cementitious mixture, when set, is much stronger because the excess water has been removed and simultaneously the particles have been vibrated to their positions of maximum density. Vibration alone produces increased density, but unless the excess water made free by the vibration and settling is removed, the strength of the set cementitious mass is impaired. Filtration, without vibration is not effective in reducing the water content, because the excess water is not free water until the vibration has settled the particles to positions of maximum density, or unless the amount of excess water in the mixture is much greater than is used in usual practice. The effect of vibration is to reduce the interstitial space within which the excess water is held, by settling the particles to positions of dense packing, and simultaneously releasing the water. This free water is removed through the filtering means, leaving the fine sand and cement in the cementitious mixture.

I claim:

1. In the art of compacting cementitious materials containing water, the steps of simultaneously vibrating only a portion of the mass and sucking off the excess water.

2. In the art of compacting materials containing water, the steps of simultaneously vibrating only a portion of the mass and filtering off the excess water at the point of vibration.

3. An apparatus for compacting and dewatering cementitious materials comprising a vibratory member flexibly connected by a hollow shaft to rotating means therefor, and a casing for said vibratory member and shaft having perforations in the portion adapted to be immersed in the cementitious materials, with means for applying suction to said hollow shaft.

4. An apparatus for compacting and dewatering cementitious masses comprising insertable means for vibrating the mass, a casing for said vibrating means pervious to water in its insertable portion, and means for removing the water from the interior of said casing.

5. An apparatus for compacting and dewatering cementitious masses comprising insertable means for vibrating the mass, a casing for said vibratory means, a filtering medium operatively attached to the insertable portion of said casing, and means for removing water from the interior of said casing.

6. An apparatus for treating cementitious masses comprising a motor having a hollow shaft, an out-of-balance rotary mechanism having a hollow shaft, a casing for said rotary mechanism having perforations in the portion adapted to be immersed in the cementitious masses, and suction means operatively connected to said hollow shafts for removing water in said casing.

7. An apparatus for treating cementitious masses comprising a motor having a hollow shaft, an out-of-balance rotary mechanism having a hollow shaft, a casing for said rotary mechanism having perforations in the portion adapted to be immersed in the cementitious masses, a filtering medium supported by said casing in operative position relative to said casing perforations, and suction means operatively connected with said hollow shafts for removing water in said casing.

8. An apparatus for treating cementitious masses comprising a rotary means, a perforated hollow shaft, an eccentric weight attached to said shaft, a casing for said shaft and eccentric weight having perforations in the portion adapted to be immersed in the cementitious masses, and means for removing water from said casing.

9. An apparatus for treating cementitious masses comprising a rotary means, a perforated hollow shaft, an eccentric weight attached to said shaft, a casing for said weight and shaft having perforations in the portion adapted to be immersed in the cementitious masses, a filtering medium in operative position relative to said casing perforations operatively connected to said casing, and means for removing water from said casing.

10. The method of compacting unset cementitious mixtures containing water comprising placing a mass of the mixture in a designated space, vibrating only a portion of said mass, and simultaneously removing the excess free water from the vibrated portion.

11. The method of compacting unset cementitious mixtures containing water comprising placing a mass of the mixture in a designated space, vibrating only a portion of said mass, and simultaneously sucking off the excess free water from the vibrated portion.

12. The method of compacting unset cementitious mixtures containing water comprising placing a mass of the mixture in a designated space, vibrating only a portion of said mass, and simultaneously filtering off the excess free water from the vibrated portion.

GRAHAM M. GORDON.